United States Patent [19]

Mikame

[11] 4,323,844
[45] Apr. 6, 1982

[54] TEST SYSTEM FOR DETECTING A PERMANENT DEFECT AND A TEMPORARY DEFECT IN MAGNETIC RECORDING TAPE

[75] Inventor: Yoshio Mikame, Saku, Japan

[73] Assignee: TDK Electronics Co., Ltd., Tokyo, Japan

[21] Appl. No.: 41,760

[22] Filed: May 23, 1979

[30] Foreign Application Priority Data

May 31, 1978 [JP] Japan ................................ 53/65167

[51] Int. Cl.$^3$ ..................... G01R 33/12; G01N 27/82; H03K 5/22
[52] U.S. Cl. .................................... 324/212; 307/471
[58] Field of Search ............... 324/206, 210, 212, 233, 324/227, 239, 242, 243, 140; 340/675; 307/216, 232; 356/430; 250/561, 563; 328/147; 360/25

[56] References Cited

U.S. PATENT DOCUMENTS

| Re. 24,641 | 4/1959 | Reynolds | 324/212 |
|---|---|---|---|
| 2,580,934 | 1/1952 | Love et al. | 324/206 X |
| 2,870,430 | 1/1959 | Hancock | 324/212 X |
| 3,466,535 | 9/1969 | Sterns et al. | 324/206 |
| 3,586,965 | 6/1971 | Whysong et al. | 324/212 |
| 3,755,731 | 8/1973 | Young | 324/212 |
| 3,803,425 | 4/1974 | Carp | 307/219 |
| 4,038,596 | 7/1977 | Lee | 324/210 |
| 4,127,813 | 11/1978 | Hiroshima et al. | 328/147 |
| 4,207,534 | 6/1980 | Miille | 307/216 |

FOREIGN PATENT DOCUMENTS

46069 1/1963 Poland ............................. 324/227

*Primary Examiner*—Gerard R. Strecker
*Attorney, Agent, or Firm*—Allan Ratner

[57] ABSTRACT

A system for testing magnetic tape comprising a pair of magnetic head assemblies positioned at a fixed length along the path of magnetic recording tape. A read-out signal of the first magnetic head is delayed by a delay circuit by time $t = 1/V$, where $l$ is the length between the first magnetic head and the second magnetic head, and V is the tape feeding speed. A logical AND circuit and a logical exclusive-OR circuit are provided for receiving the output of the delay circuit and the read-out signal of the second magnetic head. When the AND circuit provides an output signal, it is recognized that both the first and second magnetic heads have sensed a permanent defect. When the exclusive-OR circuit provides an output signal, it is recognized that either the first magnetic head or second magnetic head has sensed a temporary defect. Accordingly, both a permanent defect and a temporary defect are detected by running magnetic tape only once in a predetermined direction.

2 Claims, 3 Drawing Figures

TEST SYSTEM FOR DETECTING A PERMANENT DEFECT AND A TEMPORARY DEFECT IN MAGNETIC RECORDING TAPE

BACKGROUND OF THE INVENTION

This invention relates to a system of testing magnetic recording tape. Magnetic recording tape is generally subject to defective portions which are referred to as "drop outs", and if any such defective portions are present, it becomes impossible to accurately write or read information thereon or therefrom. Accordingly, in the case of magnetic tape for digital recording to be used with computers or similar equipment, tests are made for checking the absence of such defective portions, so as to guarantee each reel of magnetic tape for complete absence of defective portions or for the minimum number of possible defective portions if not zero.

There are two types of defective portions in magnetic tape depending on the causes; namely, one type caused by defects in the magnetic layer of the tape itself, such as uneven application of the magnetic layer and damages to the magnetic layer, and another type caused by incomplete contact between magnetic heads and the magnetic recording tape due to dust particles or other foreign matter deposited on the tape, so as to hamper correct writing and reading. The former type is referred to as "permanent defective portions", while the latter type is referred to as "temporary defective portions".

If any defective portions are found on the magnetic recording tape, in order to determine whether such defective portions are of permanent type or temporary type, it has been usual practice to repeat writing and reading a plurality of times at each defective portion, so that if the defect is eliminated during the repetition, the defective portion is assumed to be of temporary nature, while if the defect remains until the end of the repetition it is assumed to be of permanent nature.

FIG. 1 illustrates a circuit diagram of conventional equipment for testing the defective portions of the magnetic recording tape. In the figure, 2 and 3 are a capstan and a pinch roller, respectively, for feeding the magnetic recording tape 8 (to be referred to simply as "tape", hereinafter) in a forward direction (the direction as shown by the arrow in FIG. 1) between the reels 20 and 21. As the tape is fed in the aforesaid manner, predetermined signals from a recording circuit 4 are applied to a recording-reproducing head 1 (to be referred to simply as "RR head", hereinafter), so as to record the signal on the tape 8 and read out immediately afterwards. The signal thus read out is amplified and shaped by a read circuit 5, so as to properly reproduce the signal recorded. If the tape has any defective portions, the signal reproduced is interrupted at the defective portion, so that a defective-portion-detecting circuit 6 generates a defect signal at the output terminal 25. This defect signal acts to terminate the forward tape feeding and causes the tape 8 to be fed in the reverse direction (the direction contrary to that of the arrow) by bringing a reverse capstan 2' and a reverse pinch roller 3' into contact with the tape 8, so as to bring the defective portion to the left of the RR head 1 in FIG. 1. Then, the tape 8 is fed again in the forward direction for rechecking the defective portion.

Thus, that short portion of the tape which may include a defect is repeatedly fed forward and reverse for testing for the presence of the defective portion. After a predetermined number of times repeating the aforesaid checking through the forward and reverse tape travel, if the defect signal is still present that defective portion is regarded as permanent, while if the defect signal is removed before completing the predetermined number of the aforesaid repetitions, that defective portion is regarded as temporary.

This conventional method, however, has the following shortcomings.

(1) In order to repeat the forward and reverse tape feeding in a short period of time, quick feed and quick stop of the tape is necessary. As a result, a complicated tape feed control mechanism is required, making the test device costly.

(2) Due to the same reason, the tape is exposed to the danger of damage during the aforesaid repetition.

(3) Since a finite time is necessary for switching from feed to stop and vice versa, the total time necessary for the test is long.

(4) The time for reverse feed is wasteful as far as the actual test is concerned.

SUMMARY OF THE INVENTION

It is an object, therefore, of the present invention to overcome the disadvantages and limitations of a prior system for testing magnetic recording tape by providing a new and improved system for testing magnetic recording tape.

Another object of the present invention is to provide the system for magnetic recording tape in which both a permanent and a temporary defects are detected by running magnetic tape only once in the predetermined direction.

The above and other objects are attained by a system for testing magnetic tape comprising means including a single capstan roller and a single pinch roller for running magnetic tape linearly along a predetermined path in a predetermined direction; a first magnetic head assembly having a write-head and a read-head, said write-head positioned at a fixed distance from said read-head and at an upper stream side of said path; a second magnetic head assembly having a write-head and a read-head, said write-head positioned at a fixed distance from said read-head and at an upper stream side of said path, and having a length (l) between the read-head of the first magnetic head assembly and the read-head of the second magnetic head assembly; a record circuit for providing a signal to be recorded to said write-heads of both the first and the second magnetic head assemblies; a first and a second read circuit connected to outputs of the read-heads of the first magnetic head assembly and the second magnetic head assembly, respectively; a first and a second defective-portion-detecting-circuit connected to outputs of said first and said second read circuit, respectively; a delay circuit connected to output of said first defective-portion-detecting-circuit, a delay time (t) of said delay circuit being t=l/V, where V is the tape feeding speed; and an AND circuit having a first input connected to output of said delay circuit, and a second input connected to output of said second defective-portion-detecting-circuit.

The AND circuit determines whether both the first and second magnetic head assemblies have sensed a permanent defect. The System further includes an exclusive-OR circuit having a first input connected to output of said delay circuit, and a second input connected to output of said second defective-portion-detecting-circuit; a first output terminal connected to output of said AND circuit for providing a permanent defect detection; and a second output terminal connected to output of said exclusive-OR circuit for providing a temporary defect detection.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
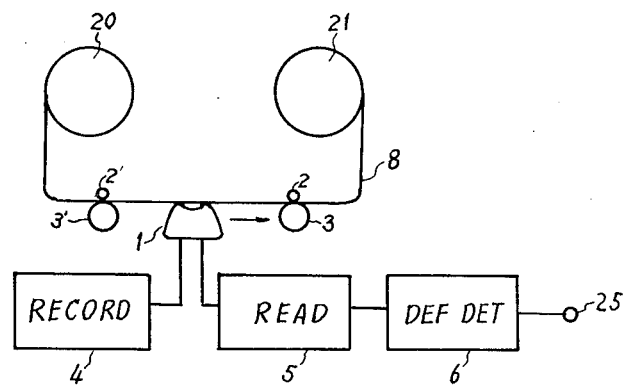
FIG. 1 is a circuit diagram of a conventional system for testing magnetic tape.
Figure 2:
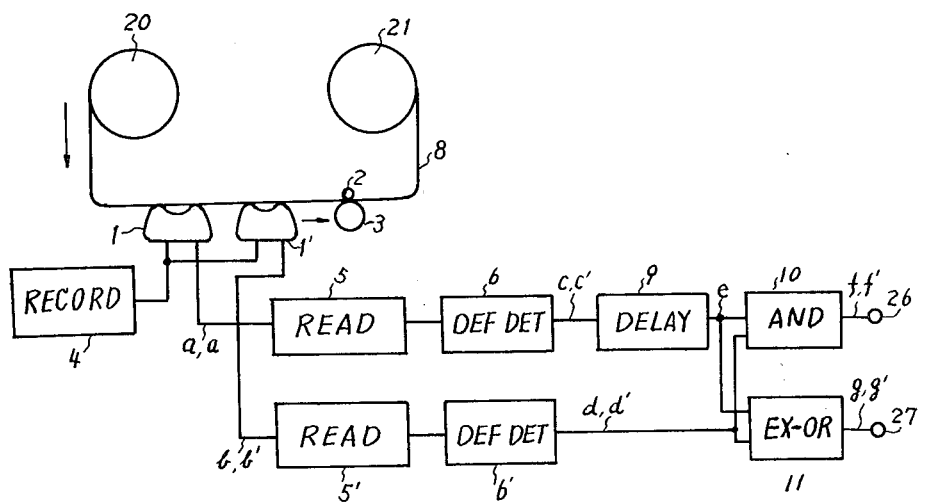
FIG. 2 is a circuit diagram of the embodiment of the system for testing magnetic tape according to the present invention.

The present invention will now be described in detail by referring to a preferred embodiment thereof, as illustrated in FIG. 2. In the figures, 2 and 3 are a capstan and a pinch roller, respectively, which are similar to the corresponding capstan and pinch roller of FIG. 1, for feeding the tape 8 between the reels 20 and 21 only in a forward direction (the direction of the arrow in FIG. 2). Two RR heads 1 and 1' act to record predetermined signals from a record circuit 4 on the tape 8 and to reproduce the signals immediately after recording. The signals reproduced by the RR heads 1 and 1' are amplified and shaped by read circuits 5 and 5', respectively, so as to properly reproduce the signals recorded. In this process, due to the presence of a possible defective portion in the tape, if the RR head 1 reproduces a signal as shown by the curve a of FIG. 3(A), and if the RR head 1' reproduces a signal as shown by the curve b of FIG. 3(A), defective-portion-detecting circuits 6 and 6' produce defect signals, as shown by curves c and d of FIG. 3(A), respectively. There is a time difference t between the signals c and d of FIG. 3(A), which can be given by t=1/V, 1 being the distance between the RR heads 1 and 1' and V being the tape feeding speed.

Figure 3:
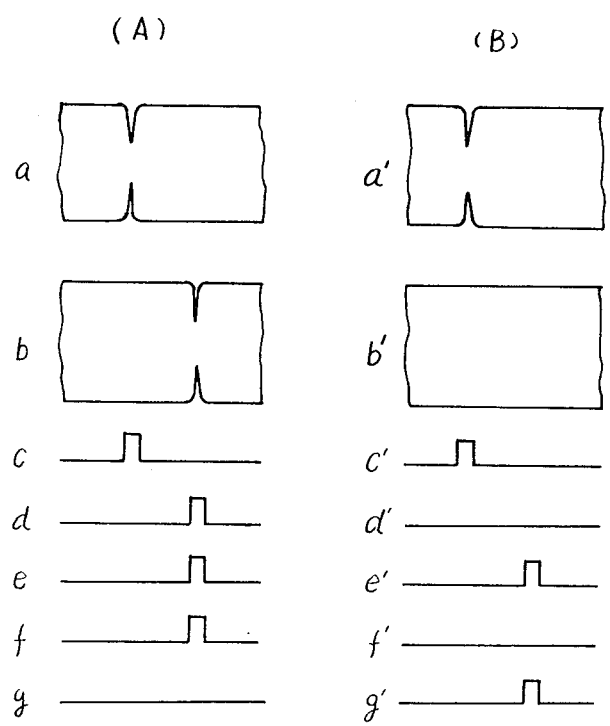
FIG. 3 shows waveforms of signals therein.

The defect signal c from the defective-portion-detecting circuit 6, which produces the signal earlier than the circuit 6', is applied to a delay circuit 9 for generating a delayed signal, as shown by the curve e of FIG. 3(A), whose timing coincides with the defect signal d from the circuit 6'. The two signals d and e are applied to an AND circuit 10, for producing a logical product signal as shown by the curve f of FIG. 3(A). With the illustrated embodiment, the presence of the logical product signal f means that both the two RR heads 1 and 1' detected a defective portion.

If a permanent defective portion is defined by the presence of defect signals from the two RR heads for that defective portion, the output at the terminal 26 from the AND circuit 10 indicates a permanent defective portion. It should be appreciated that an AND circuit provides an output signal only when all the input terminals thereof receive the high level input signals.

It is noted here that the two RR heads of the illustrated embodiment correspond to one forward-reverse operation of the conventional method. In order to make the embodiment of the present invention correspond to a plurality of forward-reverse repetitions of the tape feeding, it is sufficient to provide a corresponding number of magnetic heads between the RR heads 1 and 1'.

Referring to signal series (B) of FIG. 3(B), if the RR head 1 detects a defective portion and produces a signal a' while the other RR head 1' does not detect it and produces no signal as shown by b' of FIG. 3(B), the defective-portion-detecting circuit 6 produces a defect signal c' but the other defective-portion-detecting circuit 6' produces no signal, as shown by d' of FIG. 3(B). Accordingly, even if the output signal from the defective-portion-detecting circuit 6 is applied to the delay circuit 9 for applying the output e' therefrom to the AND circuit 10 together with the output from the other defective-portion-detecting circuit 6', the logical product signal from the circuit 10 is nil as shown by f' of FIG. 3(B), indicating that there is no permanent defective portion. It is noted in FIG. 2 that the output signals from the two defective-portion-detecting circuits 6 and 6', e.g., signals d' and e', are also applied to an exclusive OR circuit 11. In this case, the exclusive logical sum signal at the output terminal 27 from the circuit 11 takes a unit value as shown by g' of FIG. 3(B), indicating that a defective portion of temporary type has been detected.

It is apparent that if both of the RR heads 1 and 1' reproduce finite signals, the exclusive OR circuit 11 does not produce any output signal, as shown by g of FIG. 3(A). Besides, if a plurality of such second RR heads 1' are provided at suitable intervals, any change of the nature of the defective portion can be detected at different stages.

It should be appreciated that an exclusive-OR circuit provides an output signal only when the first input of the same is high level and the second input of it is low level, and when the first input of it is low level and the second input of it is high level.

As described in the foregoing, with the system according to the present invention, two RR heads at a suitable interval therebetween are used together with two defective-portion-detecting circuits connected to the RR heads, respectively, so as to indicate a permanent defective portion in the case that both of the defective-portion-detecting circuits generate signals while distinctively indicating a temporary defective portion in case that only one of the two defective-portion-detecting circuits produces the defect signal. Thus, the present invention enables the testing of magnetic tape for defective portions while allowing the tape to run continuously in only one direction, so that the aforesaid shortcomings of the conventional method are completely obviated.

From the foregoing it will now be apparent that a new and improved system for testing magnetic tape has been found. It should be understood of course that the embodiment disclosed is merely illustrative and is not intended to limit the scope of the invention. Reference should be made to the appended claims, therefore, rather than the specification as indicating the scope of the invention.

What is claimed is:

1. A test system for detecting a permanent defect and a temporary defect in magnetic recording tape comprising;

(a) means including a single capstan roller and a single pinch roller for running magnetic tape linearly along a predetermined path in a predetermined direction, (b) a first magnetic head assembly having a write-head and a read-head, said write-head positioned at a fixed distance from said read-head and at an upper stream side of said path, (c) a second magnetic head assembly having a write-head and a read-head, said write-head positioned at a fixed distance from said read-head and at an upper stream side of said path, and having a length (l) between the read-head of said first magnetic head assembly and the read-head of said second magnetic head assembly, (d) a record circuit for providing a signal to be recorded to said write-heads of both said first and said second magnetic head assemblies, (e) a first and a second read circuit connected to outputs of the read-heads of the first magnetic head assembly and the second magnetic head assembly, respectively, (f) a first and a second defective-portion-detecting circuit connected to outputs of said first and said second read circuit, respectively, (g) a delay circuit connected to output of said first defective-portion-detecting-circuit, a delay time (t) of said delay circuit being $t = l/V$, where V is the tape feeding speed, (h) an AND circuit having a first input connected to output of said delay circuit, and a second input connected to output of said second defective-portion-detecting-circuit, said AND circuit determining whether both said first magnetic head assembly and said second magnetic head assembly have sensed a permanent defect, (i) an exclusive-OR circuit having a first input connected to output of said delay circuit, and a second input connected to output of said second defective-portion-detecting-circuit, said exclusive-OR circuit determining whether either said first magnetic head assembly or said second magnetic head assembly has sensed a temporary defect, (j) a first output terminal connected to output of said AND circuit for providing permanent defect detection, and (k) a second output terminal connected to output of said exclusive-OR circuit for providing temporary defect detection.

2. The invention as defined in claim 1, further comprising a pair of tape reels for supplying and taking up magnetic tape.

* * * * *